(12) United States Patent
Brockerhoff

(10) Patent No.: US 7,607,384 B2
(45) Date of Patent: Oct. 27, 2009

(54) PISTON FOR AN AXIAL-PISTON ENGINE OF THE INCLINED-AXIS TYPE AND PROCESS FOR MANUFACTURING SUCH PISTONS

(75) Inventor: Rolf Brockerhoff, Waldachtal (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 261 days.

(21) Appl. No.: 11/664,010

(22) PCT Filed: Dec. 14, 2005

(86) PCT No.: PCT/EP2005/013437

§ 371 (c)(1),
(2), (4) Date: Mar. 28, 2007

(87) PCT Pub. No.: WO2006/069632

PCT Pub. Date: Jul. 6, 2006

(65) Prior Publication Data
US 2008/0083326 A1  Apr. 10, 2008

(30) Foreign Application Priority Data
Dec. 22, 2004  (DE) .................... 10 2004 061 863

(51) Int. Cl.
*F01B 31/08* (2006.01)
*B23P 15/10* (2006.01)

(52) U.S. Cl. .................... 92/181 R; 92/186; 29/888.04

(58) Field of Classification Search .................... 92/176, 92/181 R, 186; 29/888.04
See application file for complete search history.

(56) References Cited

U.S. PATENT DOCUMENTS

| 4,519,300 A | 5/1985 | Adomis, Jr. et al. |
| 5,265,331 A | 11/1993 | Engel et al. |
| 6,279,452 B1 * | 8/2001 | Moya .............................. 92/57 |

FOREIGN PATENT DOCUMENTS

| DE | 33 19822 A1 | 12/1983 |
| DE | 43 01 140 A1 | 7/1993 |
| DE | 196 43 389 C1 | 1/1998 |
| DE | 197 06 075 C2 | 8/1998 |
| DE | 198 37 647 A1 | 3/2000 |
| DE | 199 34 216 A1 | 2/2001 |
| DE | 103 05 136 A1 | 8/2004 |
| WO | WO 01/07201 A1 | 2/2001 |

* cited by examiner

*Primary Examiner*—Michael Leslie
(74) *Attorney, Agent, or Firm*—Scully, Scott, Murphy & Presser, P.C.

(57) ABSTRACT

A piston (2) for a piston engine, in particular for an axial-piston engine (1) of the inclined-axis type, comprises a conical section (26), a neck region (19) and a ball end (9) which is formed onto said neck region (19), a clearance (15) which is constructed in the piston and a pin (14) which is constructed in said clearance (15). The wall (20) of the piston (2) has different thicknesses of material in different sections of its axial length.

22 Claims, 2 Drawing Sheets

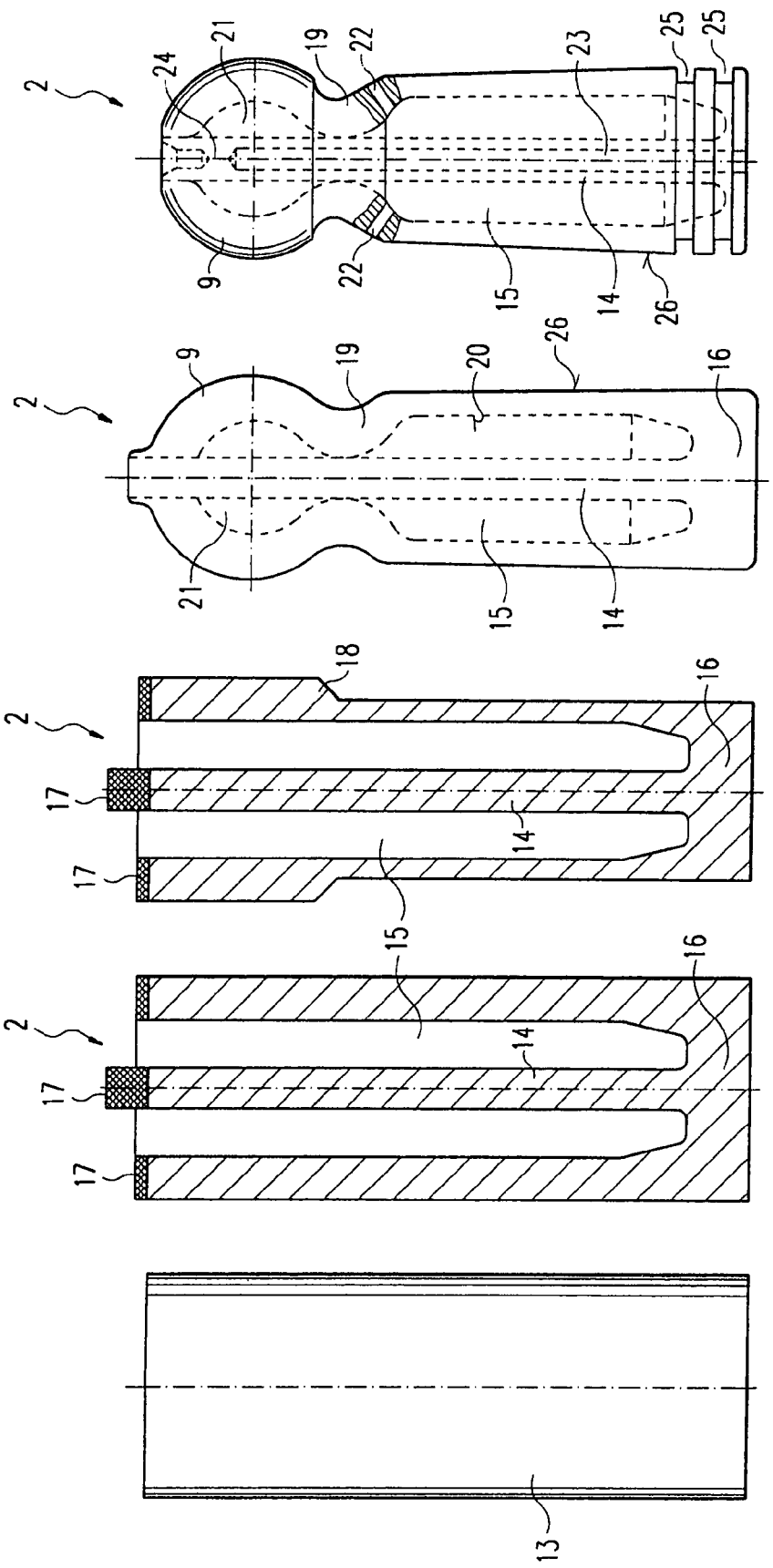

Figure 1:
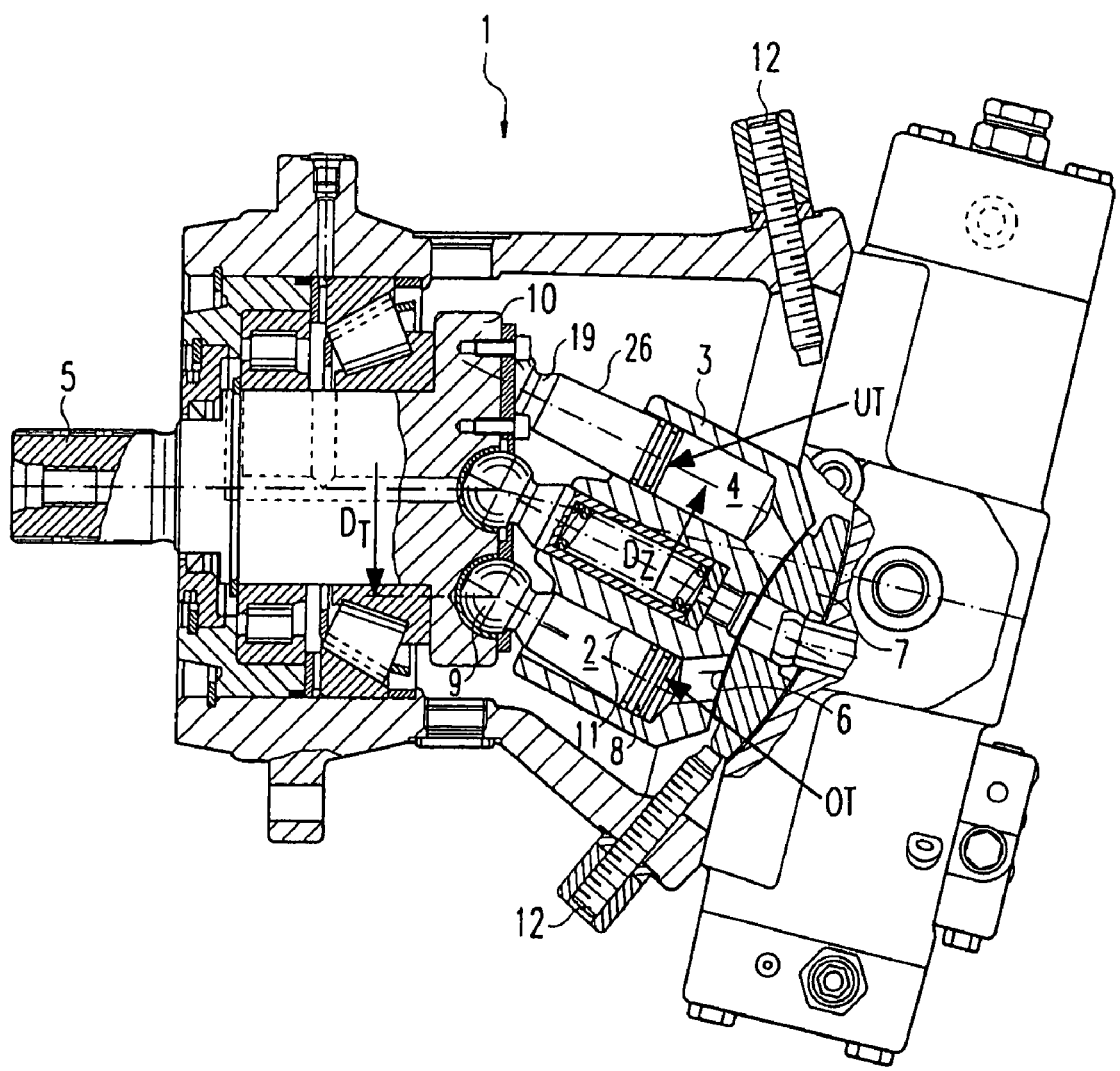

PISTON FOR AN AXIAL-PISTON ENGINE OF THE INCLINED-AXIS TYPE AND PROCESS FOR MANUFACTURING SUCH PISTONS

The invention relates to a piston for an axial-piston engine of the inclined-axis type according to Claim 1, and to a process for manufacturing such a piston according to Claim 15.

Axial-piston engines are very common, e.g. as hydraulic pumps for hydraulic fluids. From DE 33 19 822 A1, for example, a hydraulic pump is known which comprises a pump body, a cylindrical rotor and an outer carrier which surrounds the rotor and in which said rotor is fastened. An inlet and an outlet are also provided in one face of the pump body for the fluid to be conveyed. Constructed in the rotor are a number of cylinders which extend parallel or radially in relation to the rotor axis at equal angular intervals. Pistons which can be moved to and fro when the rotor rotates are disposed in the cylinders. A cam drive for the rotor is provided, by means of which the cylinders are moved successively over the face and past the inlet for the purpose of sucking in fluid, and successively past the outlet, as a result of which said fluid is expelled at the outlet face under the action of the pistons. Also provided between the inlet and the outlet is a pre-compression zone past which the cylinders move when they move from said inlet to said outlet.

What is disadvantageous about the known axial-piston engines of the inclined-axis type is, in particular, the solid design of the pistons which, on the one hand, limits the rotational speed of the piston engine because of the forces which are operating.

On the other hand, in the case of solid pistons, their capacity for absorbing impacts, which are unavoidable because of irregularities in the rotation of the cylinder drum when the axial-piston engine is running, is inadequate, as a result of which the rotational speed is likewise limited and, in addition, mechanical damage to the pistons and cylinder drum can occur more quickly.

The object of the invention is accordingly to provide a piston for an axial-piston engine of the inclined-axis type which is light and elastic enough to absorb impacts and guarantee round running, even at high rotational speeds, and which is favourable in terms of manufacture, and said object is also to indicate a process for manufacturing such pistons.

This object is achieved, in respect of the piston, by means of the features in Claim 1 and, in respect of the process, by means of the features in Claim 15.

The piston advantageously has a clearance and also suitable internal and external contours, the thickness of the material of the individual regions being selected so as to be different depending upon the requirements.

The construction of a thicker base for receiving the piston rings, of an almost solid ball end for stabilising the piston, and also of thin walls in the conical region of the piston for the purpose of saving weight, is particularly advantageous.

Advantageous further developments of the piston configured in accordance with the invention and of the process according the invention are indicated in the subclaims.

The invention, and other advantages which can be obtained by means of it, will be explained in greater detail below with the aid of preferred configurations and the drawings, in which:

FIG. 1 shows a cut-away representation of an axial-piston engine of the inclined-axis type, which is suitable for using the pistons configured in accordance with the invention; and FIGS. 2A-E show a diagrammatic representation of the process steps needed for manufacturing a piston which is configured in accordance with the invention.

FIG. 1 shows an axial section through an axial-piston engine 1 of the inclined-axis type which is suitable for using the piston 2 configured in accordance with the invention. The basic composition of an axial-piston engine 1 of the inclined-axis type is known, so the following description can be confined to those components which are essential to the invention.

The axial-piston engine 1 comprises a cylinder drum 3 in which there are constructed, preferably at equal angular intervals, a plurality of cylinders 4 in which pistons 2 for conveying hydraulic fluid are guided. The axial-piston engine 1 has a rotating shaft arrangement 5 which drives the cylinder drum 3. Said cylinder drum 3 runs against a face 6 which is adjustable in its inclination, as a result of which the pistons 2 are moved to and fro in the cylinders 4 and convey fluid. Displacement, along a radial path, of the component 7 carrying the face 6 changes the angle of inclination of said face 6 and, with it, the stroke of the pistons 2 or the quantity delivered. Stops 12 are provided for the purpose of limiting the angle of swiveling of the component 7.

The pistons 2 have a conical section 26, a neck region 19 and a ball end 9 which is formed out on said neck region and which engages in a guide body 10 and is in operative connection, through said guide body, with the shaft arrangement 5. The conical section 26 is provided with piston rings 8 which serve for sealing purposes.

Synchronisation of the rotating movement of the shaft arrangement and of the cylinder drum 3 takes place by means of the pistons 2 which rest, with their conical sections 26, against the walls 11 of the respective cylinders. Because of the geometry of the conical pistons 2 and of the corresponding cylinder walls 11, a differential angle between the shaft arrangement 5 and the cylinder drum 3 comes into being, which differs according to the angle of rotation and produces irregular rotation of said cylinder drum 3.

Under these circumstances, the cylinder drum 3 is entrained, in each case, only by that piston which has the smallest differential angle in relation to the cylinder wall 11. Since the differential angle is a n-periodic function, each of the pistons 2 alternates as the guiding piston twice per revolution. The change of entrainment to the diametrically opposite piston 2 takes place, in each case, in the vicinity of the upper and lower dead centre, as identified by OT and UT respectively in FIG. 1, of the pistons 2. The irregularity of rotation of the cylinder drum 3 is greatest in a middle range of the angle of swiveling. Enlargement of the maximum angle of swiveling of the axial-piston engine 1 brings about a superproportional rise in irregularity in the middle range of the swiveling angle.

Since the curve of the differential angle is made up of the individual pieces of the curve of the entrainment range of the respective pistons 2 and is mathematically discontinuous, velocity jumps of, in theory, infinitely short duration arise at the change of entrainment. These velocity jumps are dependent upon the rotational speed and also upon the amplitude of the deviations from synchronism in the rotation of the cylinder drum 3, and cause impacts which can lead to critical rotational vibrations of the cylinder drum 3 with adhesively abrasive wear between the piston 2 and the cylinder wall 11, and subsequently to malfunctions of the axial-piston engine 1.

If the possibility of elastic spring deflection of the piston is improved by suitable measures, the forces occurring in the event of impacts can be reduced by an improved capacity for absorbing the impact energy.

According to the invention, the pistons 2 of the axial-piston engine 1 represented are therefore constructed as closed hollow pistons 2 with the lowest possible wall thickness, in order to obtain an improved possibility of elastic spring deflection. This is possible, in the case of axial-piston engines 1 of the inclined-axis type, particularly because, in contrast to axial-piston engines of the swash-plate type, it is necessary to transmit only negligibly small transverse forces for entraining the cylinder drum 3.

On account of its special, conical shape, the construction of the piston 2 as a rotary-swaged part from a cold-extruded semi-finished product suggests itself. In this case, the wall thickness can be selected to be suitably thin, it being necessary to select a greater wall thickness only in the region of the piston rings 8 for reasons of strength, since the piston 2 is subjected to load by the operating pressure at this point.

Under these circumstances, the advantages of elastic pistons 2 of optimised weight lie particularly in the possibility of increasing the rotational speed and angle of swiveling of the axial-piston engine 1 of the inclined-axis type.

In this case, the pistons 2 are manufactured by the process according to the invention, as is diagrammatically represented in FIGS. 2A to 2E.

FIG. 2A shows a first production step, in which round stock 13 is trimmed off to the desired length. In this case, the diameter of said round stock 13 preferably amounts to about 1.1 to 1.5 times, and in particular preferably about 1.15 to 1.2 times, the diameter of the ball end 9 of the piston 2. This is, at the same time, the maximum diameter of the conical piston 2.

The next production step, by means of which an internal contour is pressed into the round stock 13 by cold extrusion, is represented in FIG. 2B. Suitable thicknesses of material, which guarantee the strength of the piston 2, are to be selected for an internally constructed pin 14, for an internal clearance 15 in the piston 2, into which clearance said pin 14 extends, and for the base 16 of said piston 2. Overflows of material 17 resulting from the cold-extrusion operation can be left as they are during the succeeding processing steps and can also be used in the further shaping of the piston 2. The clearance 15 has a smaller diameter in a region that faces towards the base 16 of the piston 2, and the latter therefore has a greater wall thickness in this region.

FIG. 2C shows the next process step involving the preparation of the external contour of the piston 2 by rough-turning. In this operation, material is removed in the region of the closed end of the blank, while a shoulder 18 with an increased thickness of material is left in the region of an open end. In the following process step, this region is shaped to form the ball end 9 of the piston 2. At the same time, the wall thicknesses in the region of the base 16 of the piston 2 are to be selected in such a way that the piston rings 8 can be installed without weakening said piston 2.

FIG. 2D shows the process step involving the rotary swaging of the piston 2 in the region of the ball end 9. The ball end 9 on the one hand, and the conical shape of the piston 2 on the other, are manufactured by the rotary-swaging operation. In the process, a neck region 19 is formed-in in such a way that an inner wall 20 of the clearance 15 is brought into abutment against the pin 14. As a result of this, said clearance 15 is closed off against the neck region 19. A further cavity 21 is constructed in the ball end 9.

Finally, bores 22, through which the clearance 15 can be filled with a suitable fluid, such as oil for example, are installed, as represented in FIG. 2E, in the neck region 19 of the piston 2. This ensures that no pressure of fluid builds up in said clearance 15. Furthermore, a longitudinal bore 23 with a fixed restrictor 24 is installed in the pin 14 in order to guarantee uniform pressure lubrication of the ball end 9. Grooves 25 for the piston rings 8 are turned into the region of the base 16 of the piston 2. Said piston 2 is then hardened and ground.

The invention is not limited to the exemplified embodiment represented. A piston 2 of corresponding construction may, alternatively, also be constructed as an open hollow piston 2 if the loss of efficiency resulting from the higher dead volume is acceptable. An embodiment of the closed hollow piston 2 as a friction-welded part or with a soldered cover on the base 16 of the piston 2 is likewise conceivable. The individual features of the invention can be combined with one another in any desired manner.

The invention claimed is:

1. Piston for an axial-piston engine of the inclined-axis type, said piston comprising a conical section, a neck region and a ball end which is formed onto said neck region, a clearance which is constructed in the piston, and a pin which is constructed in said clearance,
   wherein the wall of the piston has different thicknesses of material in different sections of its axial length,
   wherein a radial diameter of the clearance decreases towards the base of the piston;
   wherein the clearance is closed off, in the neck region, by the abutment of an inner face of the wall of said clearance against the pin;
   wherein at least one bore is constructed in the neck region; and
   wherein the clearance is fillable with a hydraulic fluid though the at least one bore.

2. Piston according to claim 1,
   wherein the thickness of the material of the piston in the base of said piston and in the region of the ball end is greater than in the conical section.

3. Piston according to claim 1,
   wherein a longitudinal bore is constructed in the pin.

4. Piston according to claim 3,
   wherein a restrictor is provided in the longitudinal bore.

5. Piston according to claim 1,
   wherein the piston is equipped with piston rings.

6. Piston according to claim 5,
   wherein the piston rings are disposed in grooves in the region of the base of the piston.

7. Piston according to claim 1,
   wherein a cavity is constructed in the ball end.

8. Piston according to claim 1,
   wherein the piston is manufactured from round stock by cold extrusion and rotary swaging.

9. Piston according to claim 8,
   wherein the thickness of the material of the round stock is so dimensioned that it amounts to 1.1 to 1.5 times the diameter of the ball end.

10. Piston according to claim 9,
    wherein the diameter of the round stock determines the maximum diameter of the piston.

11. Piston according to claim 8,
    wherein the thickness of the material of the round stock is so dimensioned that it amounts to 1.15 to 1.2 times the diameter of the ball end.

12. Piston according to claim 1,
    wherein said conical section, neck region, ball end and pin are constituted of a unitary structure.

13. Process for manufacturing a piston for an axial-piston engine of the inclined-axis type, wherein said piston comprises a conical section, a neck region and a ball end which is formed onto said neck region, a clearance which is constructed in the piston and a pin which is constructed in said clearance, and wherein the wall of the piston has a different thicknesses of material in different sections of its axial length, wherein said process comprises the following steps:
a) the trimming of round stock to the desired length;
b) the manufacture of an internal contour by cold extrusion;
c) the preparation of the external contour by rough-turning;
d) the manufacture of the external contour by round swaging; and
c) finishing.

14. Process according to claim 13,
wherein the second process step b) comprises the following partial steps:
the selection of a suitable diameter for the pin and the clearance;
the selection of the thickness of material for a base of the piston; and
the cold extrusion of the internal contour of the piston, taking into account the dimensions selected.

15. Process according to claim 13,
wherein the third process step c) comprises the following partial steps:
the rough-turning of an external contour for the piston, with removal of material in what will subsequently be the conical section of the piston; and
adaptation of the thickness of material in the form of a shoulder in the region of the ball end which is to be shaped.

16. Process according to claim 13,
wherein the fifth process step e) comprises the following partial steps:
the installation of at least one bore in the neck region of the piston;
the filling of the clearance in the piston with a suitable fluid;
the installation of a longitudinal bore with a restrictor in the pin;
the installation of grooves for piston rings in the region of the base of the piston; and
the hardening and grinding of said piston.

17. Piston for an axial-piston engine of the inclined-axis type, said piston comprising an elongate conical section, a neck region formed at the narrower diameter end of said elongate conical section, a ball end having a cavity provided therein, said ball end being formed onto said neck region, a clearance which is constructed in the piston, and a pin which is constructed to extend in said clearance,
wherein the wall of the piston formed by said clearance has different thicknesses of material in different sections of its axial length, the thickness of the material of the wall of the piston in the region of the cavity in the ball end being greater than the wall thickness in the elongate conical section.

18. Piston according to claim 17,
wherein said elongate conical section, at the larger diameter end thereof, extends into a base of said piston having a greater wall thickness than the remaining axial extent of the elongate conical section.

19. Piston according to claim 18,
wherein said remaining axial extent of the elongate conical section has a uniform wall thickness between said base and said neck region.

20. Piston according to claim 18,
wherein said clearance has a radially decreasing outer diameter at a closed end portion of said clearance proximate said base so as to form a heavier wall thickness at the larger diameter end of said elongate conical section.

21. Piston according to claim 20,
wherein at least one circumferential groove is formed in said base proximate said heavier wall thickness for receiving a piston ring.

22. Piston according to claim 21,
wherein two said grooves are formed in said base in parallel spaced relationship, each said groove having a piston ring receivable therein.

\* \* \* \* \*